United States Patent [19]

Czipri

[11] Patent Number: 5,285,359
[45] Date of Patent: Feb. 8, 1994

[54] POWER OPERATED BOAT LIGHT

[75] Inventor: John Czipri, Clearwater, Fla.

[73] Assignee: Accon Inc., Clearwater, Fla.

[21] Appl. No.: 20,979

[22] Filed: Feb. 22, 1993

[51] Int. Cl.$^5$ .................................... B60Q 1/05
[52] U.S. Cl. .......................... 362/61; 362/66;
  362/80; 362/288; 362/386; 362/428
[58] Field of Search .............. 362/61, 63, 66, 80,
  362/269, 272, 274, 276, 285, 286, 288, 386, 427,
  428, 802

[56] References Cited

U.S. PATENT DOCUMENTS

| | | | |
|---|---|---|---|
| 1,269,426 | 6/1918 | Green | 362/286 |
| 1,801,864 | 4/1931 | Hutchison et al. | 362/286 |
| 3,192,376 | 6/1965 | Najimian, Jr. | 362/61 |
| 4,245,281 | 1/1981 | Ziaylek, Jr. | 362/285 |
| 4,360,859 | 11/1982 | Ziaylek, Jr. | 362/80 |
| 4,809,138 | 2/1989 | Stovall | 362/427 |
| 4,856,452 | 8/1989 | Pingel et al. | 362/61 |
| 5,023,760 | 6/1991 | Izuno | 362/80 |
| 5,075,834 | 12/1991 | Puglisi | 362/386 |
| 5,119,068 | 6/1992 | Nagai et al. | 362/63 |

Primary Examiner—Ira S. Lazarus
Assistant Examiner—Y. Quach
Attorney, Agent, or Firm—Harold D. Shall

[57] ABSTRACT

A navigation light for a boat including a base plate mounted over a hole in the deck, or over a hole in the cabin side or hull side. The base plate has an opening therein in which is pivotally mounted a bulb carrying insert, with the insert being moveable between a flush position and a projecting position relative to the base plate. A solenoid connected in series with the light bulb in the light circuit is activated when the circuit is actuated and moves the insert from its flush position to its projecting position. In a first embodiment, a bow light, a spring is provided to assist the solenoid in moving the insert to its projecting position. In a second embodiment, a side light, a spring is provided to return the insert to its flush position.

5 Claims, 2 Drawing Sheets

POWER OPERATED BOAT LIGHT

BACKGROUND OF THE INVENTION

This invention relates to boat lights generally, and more particularly to navigation lights which have a depressed, flush inoperative position and an upright exposed position wherein they may be activated to provide navigation light, and are manually movable between such positions.

Navigation lights for boats have been in use for many years and, in fact, are currently required on certain size boats by U.S. Coast Guard regulations. The forwardly facing navigation lights are red and green. If such light is on the bow of the boat, called a bow light, it usually is a combined red and green light with the green light pointing to the right or starboard, and the red light pointing to the left or port side of the boat. If the light is mounted on a vertical surface, such as the hull side or on the side of a cabin, and hereinafter referred to as a side light, there is a separate light mounted on each side of the boat, with the light on the starboard side being green and the light on the port side being red.

With prior art bow and side navigation lights, the light housing projects above the deck if it is a bow light, and if it is a side light, it projects from the side of the vertical surface whether or not in use. The lights of the instant invention, when in an operative position, project from the deck, hull or cabin where they are mounted and such a projecting light provides a hazard, since the deck or cabin mounted light may be tripped over bumped into or entangled while the hull mounted light may strike a dock, piling or the like and cause damage to the light or to the boat. It is therefore desirable to have a base plate which is secured to the deck, cabin or hull, which base plate contains a light carrying insert with the insert being movable between flush and projecting postions and being movable to such projecting position by power operating means automatically at such time as the light therein is turned on and, if it is a bow light, being returnable to its flush position by operation of its own weight or if it is a side light, it also includes a resilient means to return the light to its flush position and hold the same there.

SUMMARY OF THE INVENTION

The present invention provides a forwardly facing navigation light for a boat including a deck, hull or cabin mounted base plate in which is pivotally mounted a light carrying insert, which insert has a depressed or flush position within the base plate, and a projecting position, wherein the insert projects from the base plate, and having a solenoid in the light circuit which is actuated upon the actuation of the navigation lights and which solenoid is deactivated upon deactivation of the light circuit. The bow light, upon deactivation of the solenoid, falls into its flush position by operation of its own weight. The side light includes a return spring for returning the insert to its depressed position upon deactivation of the solenoid.

DETAILED DESCRIPTION

Figure 1:
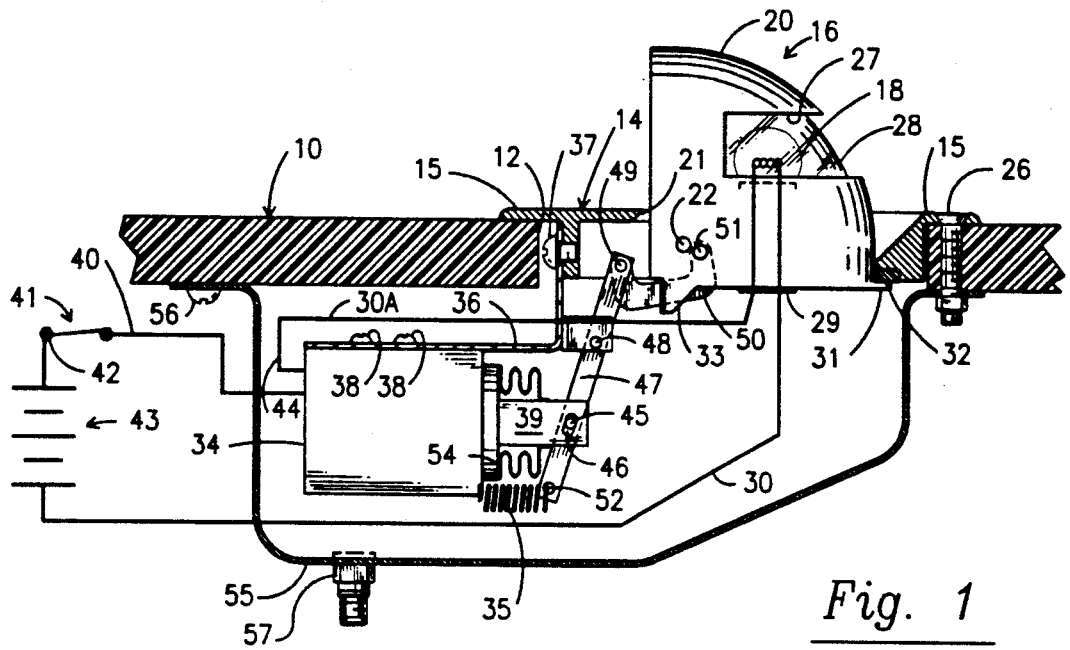
FIG. 1 is as side view of a first embodiment of this invention, a bow light, with the base plate and water retention cup shown in section and with the insert in its operative or projecting position and with the insert and solenoid being shown in full lines.
Figure 2:
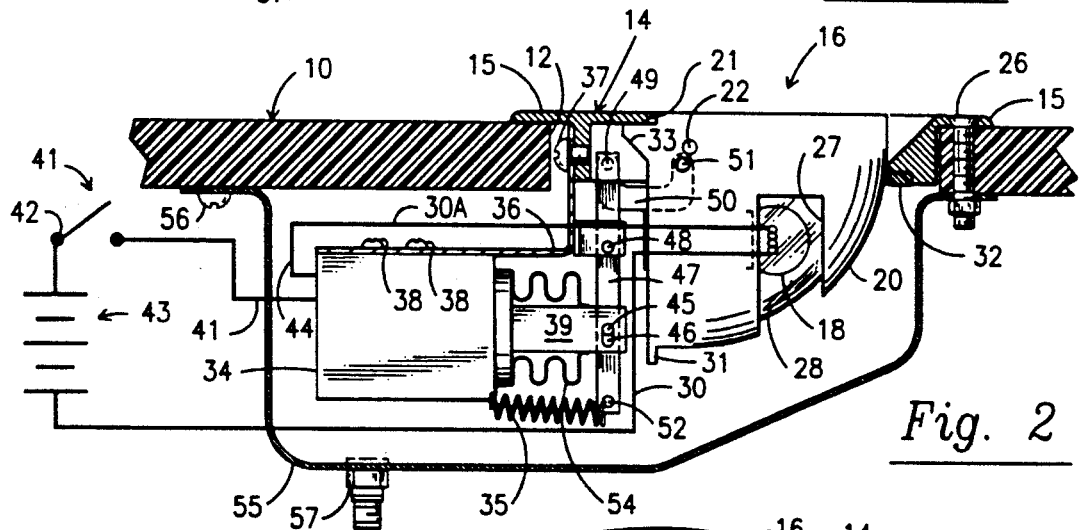
FIG. 2 is a side view of the first embodiment, taken like FIG. 1, with the insert in its flush inoperative position.
Figure 3:
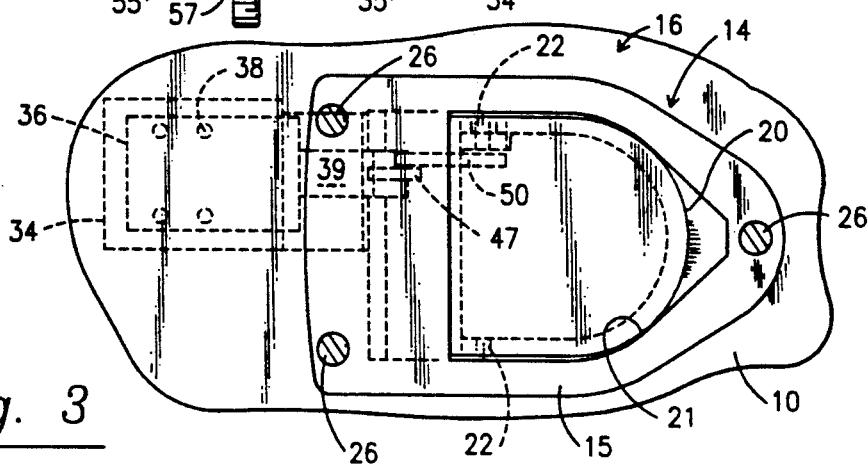
FIG. 3 is a plan view of the bow light of FIG. 1.

A first embodiment of this invention, a bow light, is shown in FIGS. 1 to 3 wherein a boat deck at the bow of a boat is shown generally at 10 and has an opening 12 therein. Inserted in the opening 12 is a base plate shown generally at 14 of a bow light assembly 16 which includes the base plate 14 and also includes a bulb 18 carrying insert 20. The base plate 14 is secured to the deck 10 as by a plurality of bolts 26 which pass through a flange 15 of the base plate and through the deck 10. The insert 20 is pivotally mounted in a registering opening 21 in the base plate 14 by a pair of aligned and spaced pivot pins 22 which extend transversely and pass through registering openings in the insert and base plate at the lower rear end of the insert. The insert 20 has a forwardly facing, transversely extending horizontal slot 27 formed therein, which slot extends for two hundred and twenty five degrees from side to side. The slot 27 is covered by a plastic shield 28, and the shield is green on the starboard half thereof and red on the port half thereof. Light from the bulb 18 shines out of the slot 27 through the colored shield 28. The base (not shown) of the bulb 18 is conventionally mounted in a socket 29, which socket is sealingly carried by the insert 20. The bulb 18 is conventionally connected to the navigation light circuit by a pair of wires 30 and 30A.

As shown in FIG. 1, the forward end of the insert 20 has a forwardly projecting tang 31 thereon, which tang, when the insert is in its projecting position shown in FIG. 1, engages a resilient, shock absorbent bumper 32. As shown in FIG. 1, the rearward lower end of the insert 20 has a downwardly projecting tang 33, which, when the insert is moved to its flush position shown in FIG. 2, engages the underside of the base plate 14.

Power means are provided to move the insert 20 from its flush position shown in FIGS. 2 and 3 to its projecting position shown in FIG. 1 and to allow the insert to return to its flush position by the force of gravity. More particularly the power means includes a solenoid 34 connected in the navigation light circuit and a resilient tension spring means in the form of a coiled tension spring 35. An "L" shaped bracket 36 which includes a lug to support a pivot pin 48 is secured by a screw 37 to the base plate 14 and extends inwardly and rearwardly therefrom. The solenoid 34 is secured to the bracket 36 by a plurality of screws 38 in a horizontal position so that the armature on core 39 thereof is disposed horizontally. A wire 40 connects the solenoid 34 to a navigation light circuit switch 41. The switch 41 is connected to the boat battery 43 at 42 and the other side of the battery is connected to the wire 30. The solenoid 34 is also connected by a wire 44 to the wire 30A so that the solenoid and the light 18 are connected in series with the battery 43 when the switch 41 is closed. The outer end of the core 39 of the solenoid 34 is connected by a pin 45 to an elongated slot 46 in a first linkage member 47 which slot is formed a short distance from the end of the member 47 which member 47 is then pivotally mounted intermediate the pin 45 and its upper end to the pivot pin 48. The upper end of the first linkage member 47 is pivotally connected by a pivot pin 49 to the left end of an "U" shaped second lever member 50, which in turn is pivotally connected at its right end to the insert 20 by a pivot pin 51. The inner end of the first linkage member 47 has a hole 52 formed therein at the lower end thereof and the forward end of the coiled tension spring 35 is connected to the member 47 while the rear end of a spring is connected to the forward end of the solenoid 34.

The solenoid 34 has a waterproof boot 54 at its right end which seals between the body of the solenoid and the core 39. A water collecting cup 55 is secured to the inner side of the deck 10 the bolt 26 at its forward end and a pair of screws, one of which is shown at 56. A drain connector 57 is connected to the bottom of the cup 55, which connector is then connected to the bilge of the boat by a line (not shown) to thereby drain any water which may collect in the cup.

Commencing with the insert 20 in its flush position, to activate the light assembly 16, the switch 41 is closed thereby activating the solenoid 34 and the light 18. Upon actuation of the solenoid the core 39 will be drawn inwardly by the magnetic field of the solenoid. Since the full weight and inertia of the insert 20 must be overcome to pivot the insert from its flush position of FIG. 2 to its projecting position of FIG. 1 and, further, since the solenoid is less effective when first activated with its core projecting therefrom and becomes more effective as it core is pulled thereinto, the tension spring 35 assists the solenoid in raising the insert. The spring 35 becomes less and less effective as its length decreases from that shown in FIG. 2 to that shown in FIG. 1, so that when the insert is fully projecting, its weight is born substantially entirely by the solenoid 34. If a stronger solenoid was chosen so that the spring 35 is not needed for the start up, then as the core of the solenoid is pulled in, the solenoid's force would be excessive and would slam the insert into its projecting position and possibly damage the insert, the bulb or the base plate. Accordingly, it has been found desirable to use a spring that will provide approximately seventy-five percent of the initial force necessary to raise the insert while having the solenoids initial force be great enough to provide the balance of the force, which solenoid force will be sufficient to hold the insert 20 in its projecting position. Upon opening the switch 41, the solenoid will become deactivated and the insert will fall to its flush position by its own weight.

Referring now to the second embodiment of FIGS. 4 and 5, a side light mounted on a vertical surface 10A of a boat, wherein elements which function the same as the first embodiment of FIGS. 1-3 will be given like numbering and will not be again explained, a side light 58 includes an insert 59 which carries a bulb 60 therein and has a horizontal slot 61 formed medially therein which slot extends from the front to the side for an angle of one hundred twelve and one-half degrees. A plastic shield, not seen in the drawings, covers the bulb 18 and is suitably secured over the slot 61, with the shield of a side light on the starboard side of the boat being green and the shield of a side light on the port side of the boat being red.

Figure 4:
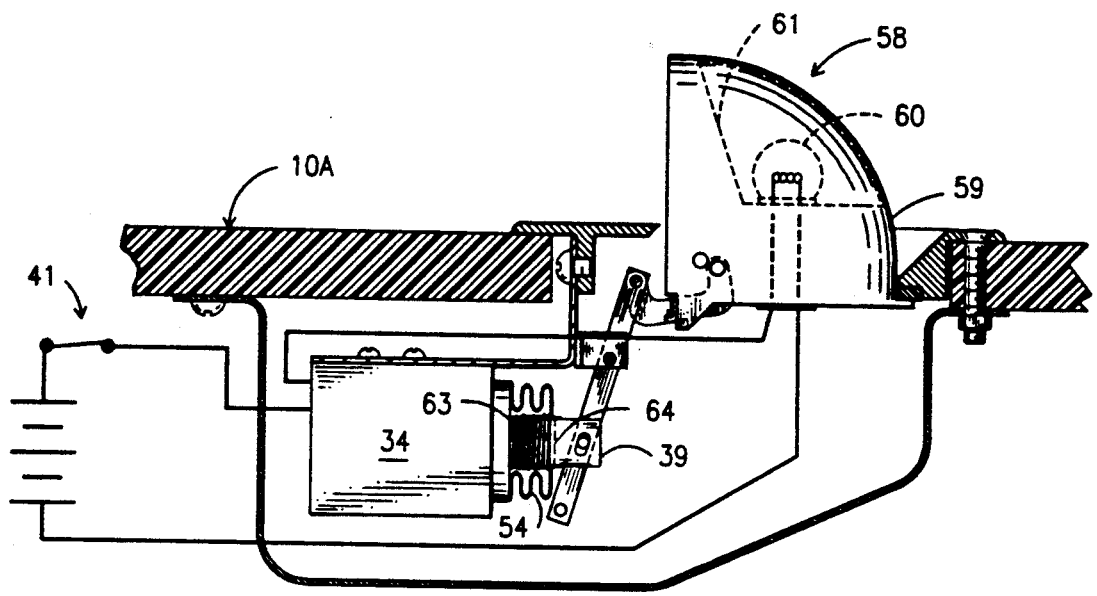
FIG. 4 is a plan view of a second embodiment of this invention, a side light, with the base plate and water retention cup shown in section and with the insert in its operative or projecting position, and with the insert and solenoid being shown in full lines.
Figure 5:
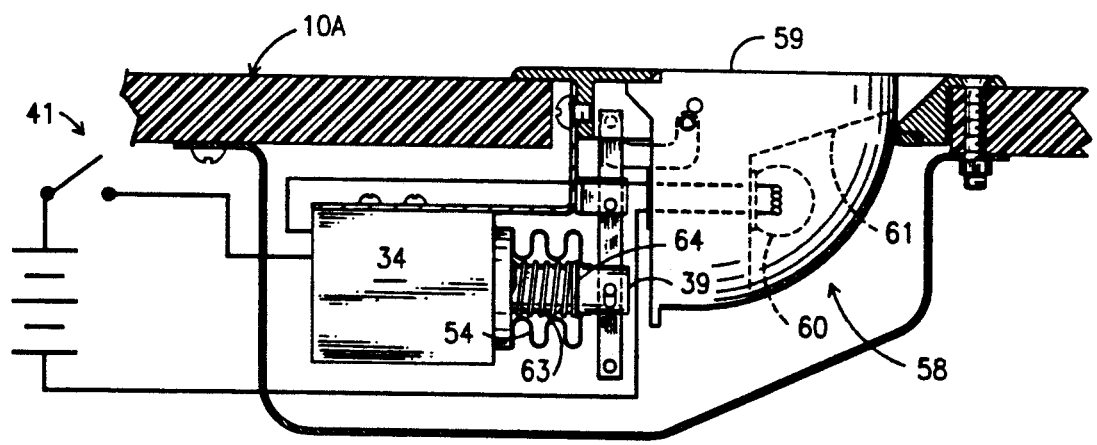
FIG. 5 is a plan view of the second embodiment of this invention taken like FIG. 4, with the insert in its flush inoperative position.

Since the insert 59 moves in a horizontal plane in moving from its flush position seen in FIG. 5, to its projecting position as seen in FIG. 4, the solenoid 34 need not lift the weight of the insert and therefore does not need a tension spring, like the spring 35 of the bow light of FIGS. 1-3, to assist the solenoid in overcoming gravity. However, the insert 59 will not return to its flush position of FIG. 5, when the switch 41 is open, of its own weight. A coiled compression spring 63 is positioned around the core 39 and on its rearward end abuts the housing of the solenoid 34 and on its forward end abuts a spring washer 64 securely carried by the core 39 adjacent to the forward end of the core and just rearwardly of the boot 54. When the switch 41 is opened from its closed position of FIG. 4, the compression spring 63 will force the core 39 outwardly and in turn force the insert 59 to move to its flush position and will hold the insert in such position until the switch 41 is again closed.

Although the above description relates to presently preferred embodiments, numerous modifications may be made therein without departing from the spirit of the invention as defined in the following claims.

What is claimed is:

1. A navigation light assembly having a flush position and a projecting position and being power operated between such positions, which assembly is for mounting in an opening formed through an exterior above-water surface of a boat comprising:
   a) a base plate including an aperture and a flange, said flange surrounding the opening in the boat surface and further including a skirt portion extending into the opening;
   b) an insert having a bulb mounted thereon pivotally mounted to said base plate for movement through the aperture in said base plate between an inoperative position where said insert is flush with said base plate and an operative position extending through and outwardly of said base plate;
   c) means for moving said insert from said inoperative to said operative position including:
   a bracket secured to said skirt portion and extending inwardly of the exterior boat surface;
   a solenoid rigidly supported on said bracket and having an armature mounted therein for reciprocating movement;
   a lever having a first end and a second end, said lever pivotally connected between said first and second ends to said bracket and adjacent said second end to said armature;
   a U-shaped link having one leg pivotally connected to said insert and another leg pivotally connected to said first end of said lever;
   and circuit means including a switch for connecting said bulb and solenoid in a series circuit with an energy source, whereby when said switch is closed said solenoid and bulb are energized, said insert is moved from inoperative to operative position.

2. An assembly accordingly to claim 1 including resilient means for assisting said solenoid to move said insert to its operative position from its inoperative position.

3. An assembly according to claim 2 wherein said resilient means is a tension spring operatively connected between said solenoid and said lever.

4. An assembly accordingly to claim 1 including resilient means for moving said insert to its inoperative position from its operative position when said switch is open thereby deactivating said bulb and said solenoid.

5. An assembly according to claim 4 wherein said resilient means is a spring connected to said armature of said solenoid for urging said armature outwardly therefrom.

* * * * *